US008312810B2

(12) United States Patent
Van Der Meulen et al.

(10) Patent No.: US 8,312,810 B2

(45) Date of Patent: Nov. 20, 2012

(54) PRINTING CYLINDER OR PRINTING SLEEVE, CUP AND METHOD FOR PRODUCING A PRINTING CYLINDER OR PRINTING SLEEVE

(75) Inventors: Michiel Van Der Meulen, Arnhem (NL); Gerrit Wolters, Gorssel (NL)

(73) Assignee: Mueller Martini Druckmaschinen GmbH, Maulburg (DE)

(*) Notice: Subject to any disclaimer, the term of this patent is extended or adjusted under 35 U.S.C. 154(b) by 367 days.

(21) Appl. No.: 12/552,841

(22) Filed: Sep. 2, 2009

(65) Prior Publication Data

US 2010/0199868 A1 Aug. 12, 2010

Related U.S. Application Data

(63) Continuation of application No. PCT/NL2008/000063, filed on Feb. 28, 2008.

(30) Foreign Application Priority Data

Mar. 2, 2007 (NL) ..................................... 1033483

(51) Int. Cl.

*B41F 13/10* (2006.01)
*B25F 5/02* (2006.01)
*F16C 13/00* (2006.01)

(52) U.S. Cl. ..................... 101/375; 101/376; 101/382.1; 492/39

(58) Field of Classification Search .................. 101/375, 101/376, 378, 382.1, 383, 384, 386; 492/39

See application file for complete search history.

(56) References Cited

U.S. PATENT DOCUMENTS

| | | | | |
|---|---|---|---|---|
| 1,984,115 | A * | 12/1934 | Cooper | 101/375 |
| 4,496,257 | A * | 1/1985 | Habelt et al. | 400/578 |
| 4,583,460 | A * | 4/1986 | Maslin et al. | 101/375 |
| 6,295,929 | B1 * | 10/2001 | Tice et al. | 101/477 |
| 6,691,615 | B2 * | 2/2004 | Fukui | 101/409 |
| 2010/0192790 | A1 * | 8/2010 | Van Der Meulen | 101/351.7 |

FOREIGN PATENT DOCUMENTS

| | | | |
|---|---|---|---|
| CH | 245 086 | A | 10/1946 |
| EP | 0127953 | A2 | 12/1984 |
| EP | 1 025 996 | A1 | 8/2000 |
| EP | 1 752 290 | A2 | 2/2007 |
| FR | 2 507 544 | | 12/1982 |
| WO | WO-2005/067364 | A2 | 7/2005 |
| WO | WO-2005/090078 | A1 | 9/2005 |

OTHER PUBLICATIONS

International Search Report, dated Aug. 26, 2008, issued in related International Application No. PCT/NL2008/000064.

International Search Report, dated Jul. 28, 2008, issued in related International Application No. PCT/NL2008/000063.

* cited by examiner

*Primary Examiner* — Judy Nguyen
*Assistant Examiner* — Leo T Hinze
(74) *Attorney, Agent, or Firm* — Venable LLP; Robert Kinberg; Ryan M. Flandro

(57) ABSTRACT

A printing cylinder for a printing machine or printing sleeve for forming a printing cylinder that includes a plurality of cups for forming a supporting inner structure of the printing cylinder or printing sleeve. Each cup includes a central disc, a radially outer edge, and a first conical surface part. The first conical surface part of one cup at least partially bears against an adjacent cup in order to form a connection between the one cup and the adjacent cup. The radially outer edges of the plurality of cups together define a substantially cylindrical surface.

18 Claims, 16 Drawing Sheets

PRINTING CYLINDER OR PRINTING SLEEVE, CUP AND METHOD FOR PRODUCING A PRINTING CYLINDER OR PRINTING SLEEVE

CROSS-REFERENCE TO RELATED APPLICATION

This application is a continuation of PCT Application No. NL/2008/000063 entitled "Printing Cylinder or Printing Sleeve, Cup and Method for Producing a Printing Cylinder or Printing Sleeve," filed Feb. 28, 2008, which claims the priority of Netherlands Application No. NL 1033483 filed Mar. 2, 2007 and Netherlands Application No. NL 1033484 filed Mar. 2, 2007, all of which are incorporated herein by reference in their entirety.

BACKGROUND OF THE INVENTION

The invention relates to a printing cylinder for a printing machine, or printing sleeve for forming a printing cylinder, which printing cylinder or printing sleeve comprises a plurality of cups for forming a supporting inner structure for the printing cylinder or printing sleeve, which plurality of cups comprises a central disc and a radially outer edge, with the radially outer edges of the plurality of cups together defining a substantially cylindrical surface. A printing cylinder or printing sleeve of this type is designed to be accommodated in a printing machine, such as an offset printing machine. The term printing cylinder is understood to refer inter alia to both a plate cylinder which carries the image to be printed, and to a cylinder which transfers ink from the plate cylinder to a web or substrate web, such as paper or film/foil material, via a so-called rubber blanket. A printing sleeve is a printing cylinder which comprises a cylindrical aperture which runs concentrically around the centre axis of the printing cylinder for accommodating a cylinder shaft. The printing sleeve may be fixedly connected to the respective cylinder shaft, or detachably connected to the cylinder shaft. In the latter case, the cylinder shaft is often fixedly connected to the printing machine and is also referred to as a mandrel.

EP-A2-0,127,953, at FIG. 11 thereof, shows a printing sleeve for a printing cylinder. The respective printing sleeve comprises a plurality of cups. Each of the cups has radial wall parts. On the outer edge of the radial wall part, there are first and second cylindrical wall parts. The second cylindrical wall parts are on an outer edge of the cups for forming a cylindrical outer surface of the printing cylinder. In this case, it should be noted that this is not the outermost surface of the printing cylinder, as there is still a rubber layer which runs around the outer surface of the common cups. The outer diameter of the first cylindrical wall parts is substantially equal to the inner diameter of the second cylindrical wall parts. As a result, the second cylindrical wall part of a first cup can be pushed over the first cylindrical wall part of a second cup in order to form a cup connection. This known printing sleeve has the drawback that it is difficult to produce.

SUMMARY

It is an object of the present invention to provide a printing cylinder or a printing sleeve for a printing cylinder which at least partially solves the above drawback, or at least to provide an alternative.

According to one aspect of the invention, there is provided a printing cylinder for a printing machine or printing sleeve for forming a printing cylinder, comprising: a plurality of cups for forming a supporting inner structure of the printing cylinder or printing sleeve; each cup comprising: a central disc, a radially outer edge, and a first conical surface part, wherein the first conical surface part of one cup at least partially bears against an adjacent cup in order to form a connection between the one cup and the adjacent cup, and wherein the radially outer edges of the plurality of cups together define a substantially cylindrical surface.

According to a further aspect of the invention, there is provided a method for producing a printing cylinder or printing sleeve, comprising: providing a plurality of cups, each cup having a conical surface part; and positioning the conical surface part of the one cup against a complementary conical surface part of an adjacent cup.

A conical surface part may have various advantages when producing a printing cylinder or printing sleeve. These advantages may occur separately, but also concurrently. Thus, it is relatively simple to fit a conical surface part completely, that is to say with little or no play, against the adjacent cup. This is advantageous, inter alia, if the connection between them is achieved by means of welding. In case the connection between them is achieved by bonding, a conical wall part has the advantage over an axial wall part that less adhesive will slide off the conical wall part when the cup is positioned against the adjacent cup.

The cups can also be provided with apertures with a view to achieving a further weight savings. In this case, the cups can also be referred to as substantially round support elements which are substantially made of sheet material and extend over a radial distance with respect to the centre axis of the printing cylinder or printing sleeve. The support bodies are substantially cup-shaped.

The plurality of cups comprises at least one second conical surface part. This offers possibilities for creating advantageous connections and/or achieving a weight saving.

In a particular embodiment, the first conical surface part of one of the plurality of cups is turned towards the second conical surface part of an adjacent cup in order to form a contact connection, in particular an adhesive connection. An (adhesive) connection with such conical surface parts can offer various advantages. Thus, a larger contact surface is obtained over a certain axial distance than with a connection on a cylindrical surface. Also, adhesive which is applied to the first conical surface part will be removed less easily when the second conical surface part is fitted than is the case with a cylindrical surface.

In one embodiment, the first conical surface part of one of the plurality of cups and the second conical surface part of one of the plurality of cups are surfaces which are situated opposite one another and delimit a conical wall part of the respective cup. Such a conical wall part results in a lighter cup than is the case with a combination of radial and cylindrical wall parts. A conical wall part can, if desired, offer various other advantages. Thus, it may limit the number of corners in the cups and/or make the angles of these corners more obtuse, as a result of which the cups can be produced more easily.

In an advantageous embodiment, at least one cup is provided with an air aperture for forming a continuous gas passage through the respective cup. This prevents pressure differences during and after the production of the printing cylinder between successive spaces delimited by the plurality of cups. Such pressure differences can, for example, press adhesive out of the respective adhesive connection during adhesive bonding.

In one embodiment, the plurality of cups comprises a radially inner edge, with the radially inner edges of the plurality of cups together defining a substantially cylindrical surface.

Such a cylindrical surface is suitable for accommodating a cylinder shaft or mandrel. It should be noted that EP-A2-0, 127,953 has bent lips on the radially inner side of the central disc. These lips are provided around an inner sleeve, with the inner sleeve being able to expand counter to the spring force of the lips. However, the respective spring force cannot be adequately controlled and the incisions which are made in order to form the lips make these known cups weak. In addition, it is difficult to ensure the roundness of the inner sleeve. The cylindrical surface according to the invention is stronger and more rigid.

In particular, the radially inner edges comprise an end and an insertion part, with the inner diameter of the insertion part being at least equal to the outer diameter of the ends, so that the end of one of the plurality of cups is accommodated in the insertion part of an adjacent cup. This results in a strong connection which, in addition, offers a degree of adjustment.

Embodiments of the invention furthermore relate to a printing sleeve for forming a printing cylinder, with the plurality of cups being provided with a cylindrical aperture which runs concentrically around the centre axis for accommodating a cylinder shaft. Embodiments of the invention also relate to a cup, designed to form a printing cylinder or printing sleeve. Embodiments of the invention furthermore relate to a method for producing a printing cylinder or printing sleeve.

As a result, it is possible to achieve a good and simple adhesive connection between the first and the second of the plurality of cups.

In particular, it is possible to use a gluing clamp which is provided on an auxiliary edge of the first of the plurality of cups and on the edge of the second of the plurality of cups. The respective auxiliary edge extends substantially radially with respect to the cups and is removed in a subsequent method step. Thus, it is possible to exert a clamping force during adhesive bonding in a surprisingly simple manner.

Prior to the positioning of the second of the plurality of cups, at least one first adhesive bead is applied to a first portion of the first of the plurality of cups by rotating the cup with respect to the adhesive-dispensing opening. By rotating the cup with respect to the adhesive-dispensing opening, it is possible to apply a constant amount of adhesive in a simple manner.

In particular, a second adhesive bead is applied at the same time as the first adhesive bead is applied to a second portion of the first of the plurality of cups. This results in an efficient method.

Further preferred embodiments of the device and method are described in the dependent claims.

BRIEF DESCRIPTION OF THE DRAWINGS

The present invention will be more readily understood from the following detailed description when read in conjunction with the accompanying drawings, in which identical parts are denoted by the same reference numerals, and in which.

DETAILED DESCRIPTION

Figure 1A:
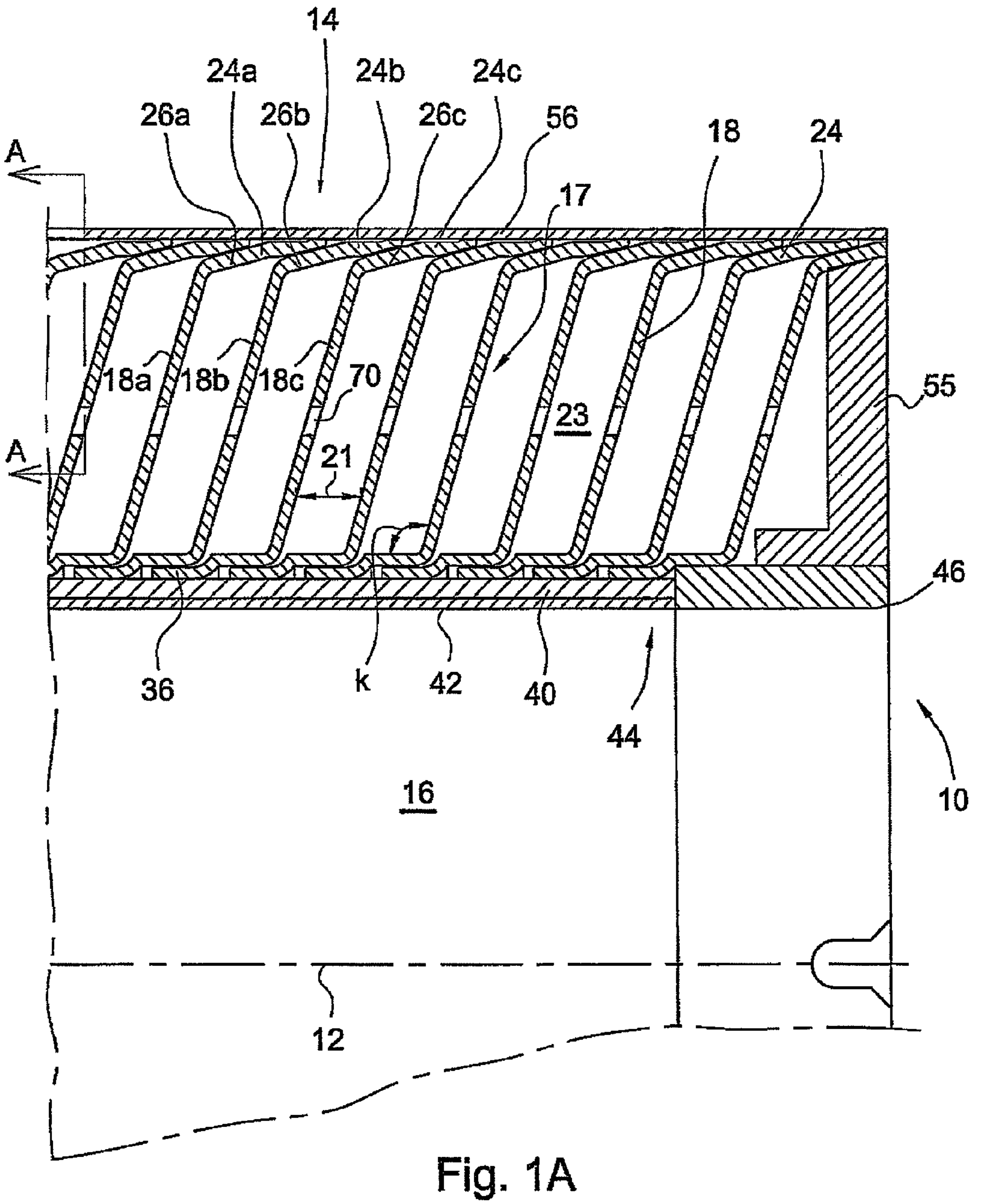
FIGS. 1A and 1B show a cross section through a printing cylinder according to the invention.
Figure 1B:
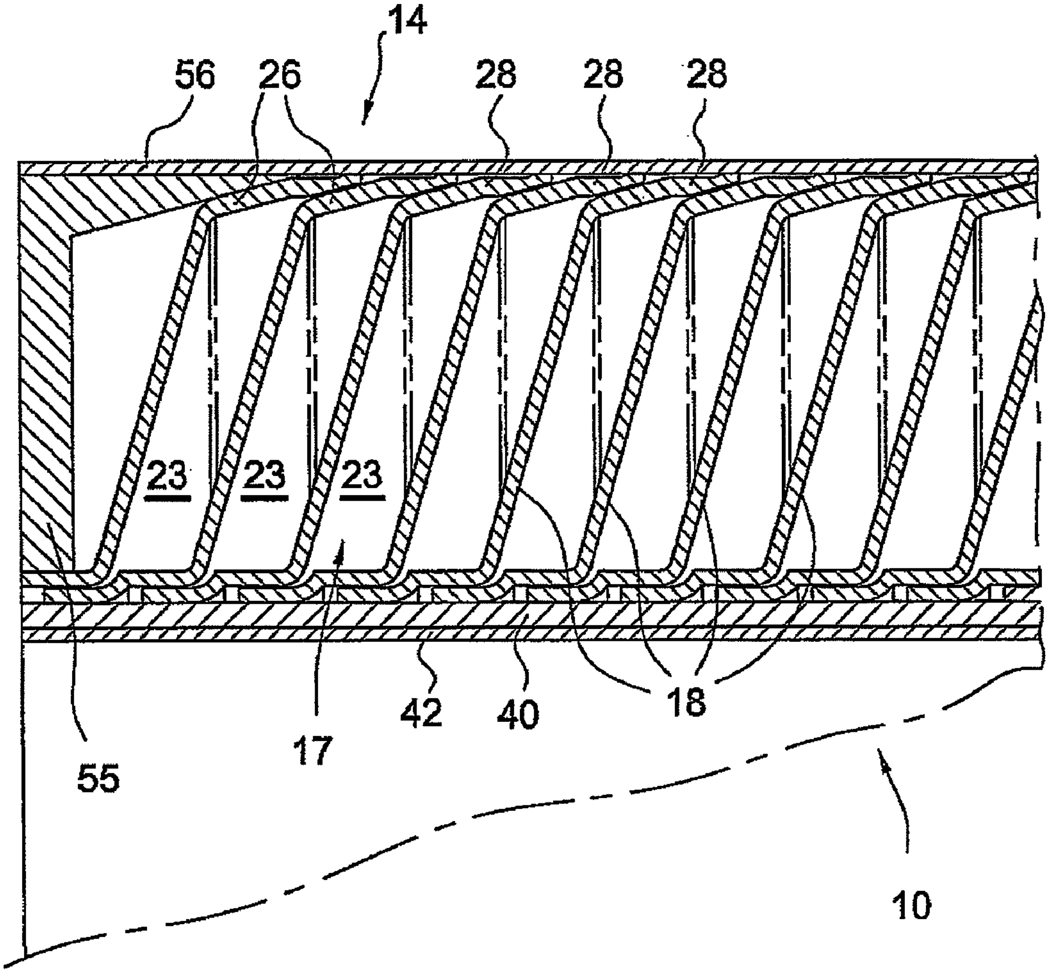

FIGS. 1A, 1B, 2, 3A and 3B show a printing cylinder or printing sleeve 10 according to the invention for use in an offset printing machine. FIGS. 4A to 4E show a cup 18. The printing cylinder 10 has a centre axis or axis of rotation 12, an exterior 14, and a cylindrical aperture 16 which is designed to be positioned around a cylinder shaft or mandrel (not shown). The embodiment illustrated in FIG. 1 is thus a printing sleeve.

The printing sleeve 10 may be fixedly connected to the respective cylinder shaft or be detachably connected thereto. In the latter case, the cylinder shaft is often fixedly connected to the printing machine and is also referred to as a mandrel. The printing sleeve comprises an internal structure 17 which supports an outer layer 56 on the exterior 14 of the printing sleeve 10. The internal structure 17 is composed of a number of annular cups 18. Preferably, the plurality of cups is substantially identical. The cups 18 are positioned at an intermediate distance 21 in the axial direction and thus define hollow spaces 23.

The radially outer edges 24 of the plurality of cups 18 together form a substantially cylindrical surface. Each radially outer edge 24 (24*a*, 24*b*, 24*c*, etc., respectively) of the respective cups 18 (18*a*, 18*b*, 18*c*, respectively) comprises a conical wall part 26 (26*a*, 26*b*, 26*c*, respectively) and a substantially cylindrical wall part 28 (28*a*, 28*b*, 28*c*, respectively) (see FIGS. 2 and 3A), which are connected to one another at an obtuse angle β. Each of the plurality of cups 18 furthermore comprises a central disc 30 and a radially inner edge 36.

The conical wall part 26 is delimited by an outer conical surface part 32 and an inner conical surface part 34. On the inside, the substantially cylindrical wall part 28 also comprises a conical surface part 37. The conical surface part 37 of the cylindrical wall part 28 is complementary to the outer conical surface part 32 of the conical wall part 26. As a result, it is possible to connect a plurality of cups 18 to one another, with the conical surface part 32*b* of one cup 18 being turned towards the conical surface part 37*a* of an adjacent cup for forming a connection.

The inner conical surface part 34 and the conical surface part 37 are separated from one another by a cylindrical surface part 29. In one embodiment, the cylindrical surface part 29 is not present, and the conical surface part 34 and the conical surface part 37 together form a single, continuous surface part.

In this embodiment, the contact connection is an adhesive connection, in particular an adhesive connection on the basis of acrylate adhesive. A methyl acrylate adhesive is particularly suitable. Other connections, including (spot) welding, soldering, bolted connections, clamp connections or other suitable connections are likewise possible. The central disc 30 of the cup is also conical, with the central disc 30 being at a smaller angle γ with respect to an imaginary radial plane than the radially outer edge 24. The central disc 30 of the cup 18 and the radially outer edge 24 are at an obtuse angle to one another.

The radially inner edge 36 and the central disc 30 of the cup are at an obtuse angle κ to one another (FIG. 1A). Such obtuse angles facilitate the production of the cup 18 and reduce the risk of cracks which may occur during production, or as a result of fatigue during use. The radially inner edge 36 of the cup 18 comprises a first part 57 which extends substantially axially and a second part 59 which extends substantially axially (FIG. 3B). The second part 59 is at a slightly greater distance to the centre axis than the first part 57. The first part 57 is in contact with the inner sleeve 41, and is connected thereto, for example bonded thereto, see also FIG. 5. The second part 59 is in contact with a first part 57 of an adjacent cup 18 and is likewise secured and/or fixedly connected thereto. A transition part 61 connects the first part 57 to the second part 59. The second part 59 is also referred to as the insertion part, and the first part 57 is also referred to as the end. The substantially axial part 57 defines a passage or opening 63.

In another embodiment for a cylinder, it is also possible to use a cup 18 without passage 63. Together, the cups are designed to keep an adjacent cup centered about a common virtual centre axis 12. It is thus possible to form a cylinder 10 without inner sleeve 41.

The cups 18 are made of aluminum. Cups are formed out of an aluminum disc by means of spinning. After spinning, the central disc 30 of the cup 18 has a thickness of essentially 1.5 mm. The outer edge 24 has a thickness of essentially 2 mm. However, other thicknesses are also possible. On the outer edge 24 of the cups described above in detail, there is also an auxiliary edge 38 which extends outwards in a radial direction of the outer edge 24.

Figure 2:
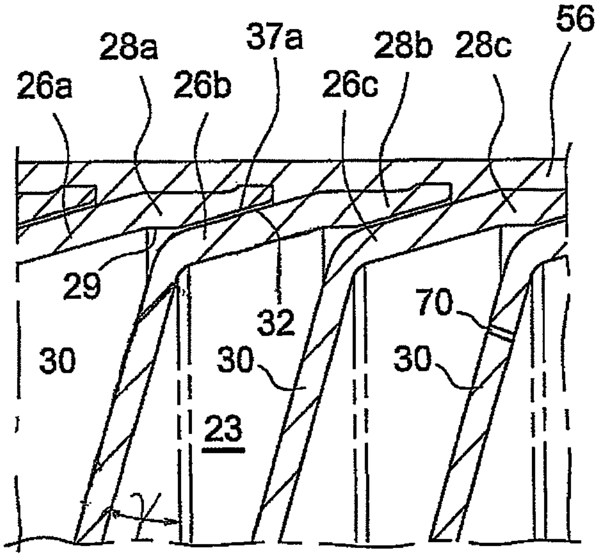
FIG. 2 shows a detailed cross section of the printing cylinder according to the invention.

As is shown in FIG. 2, a cup 18 may have an air aperture 70 to prevent pressure differences between the hollow spaces 23 during production and during use of the cylinder.

Figure 5:
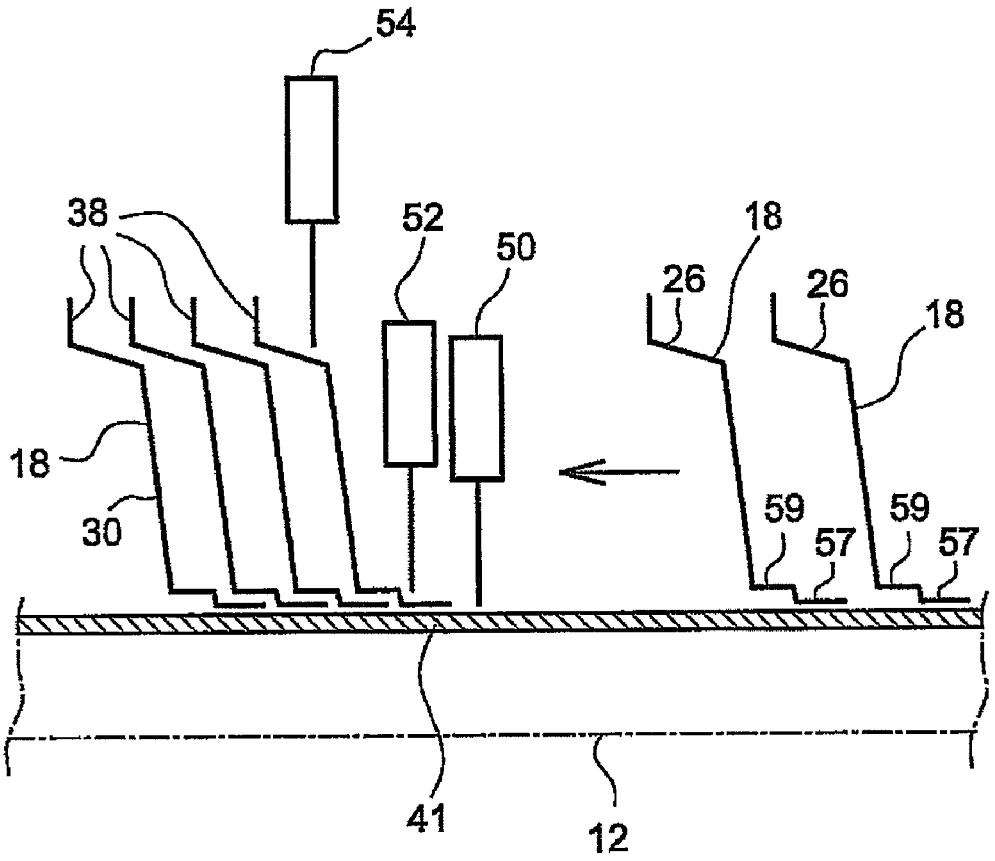
FIG. 5 shows a diagrammatic view of the production of the printing cylinder or printing sleeve according to the method.

FIG. 5 shows a phase during and method for producing the printing sleeve. The cups 18 are pickled and provided with a first adhesive component. Then, an inner cylinder 41, in particular a hollow inner cylinder or inner sleeve is provided. This inner sleeve 41 comprises an inner tube 42 made of glass-fibre-reinforced plastic, around which an outer layer 40 of compressible open-cell or closed-cell plastic foam is provided. First though, a register ring 46 is provided on the inner sleeve 41, near one end 44 thereof (FIG. 1A).

The cups 18 are then one by one pushed around the inner sleeve 41, with the first cup 18 being connected to the register ring 46 by means of an adhesive connection. After a cup has been pushed into its position, a second adhesive component is applied by means of adhesive valves, in particular by three adhesive valves 50, 52, 54 simultaneously (see FIG. 5).

Thereafter, a subsequent cup 18 is pushed onto the inner sleeve 41 and pressed onto the adhesive in the previous cup. It is possible to use gluing clamps (not shown) which can then be positioned on the auxiliary edges 38 of two adjacent cups 18 in order to provide a secure clamping arrangement during bonding. Finally, end discs 55 are fitted on the axial ends of the cylinder formed in this way in order to finish the cylinder. The register ring 46 and the end disc 55 ensure that the head ends of the cylinder or sleeve are substantially liquid-tight.

Once sufficient cups 18 have been fitted for the desired cylinder length and the adhesive has cured sufficiently, any gluing clamps which may have been used can be removed. If desired, the adhesive can be subjected to an aftercure using UV-light. The cylinder is then finish-turned during which at least the auxiliary edges 38 are substantially removed. An outer layer 56 of plastic material is applied, for example by (injection-) molding and/or rolling, around the rough cylinder 10 which has thus been formed. After the plastic has cured, the outer layer 56 is finish-turned to the desired diameter and ground.

It should be noted that the expression conical surface also refers to a surface having a varying angle of inclination. Such a surface is thus doubly curved, but can be regarded as a surface which is composed of, viewed in each case in the axial direction, short conical surfaces having a constant angle of inclination.

Figure 6:
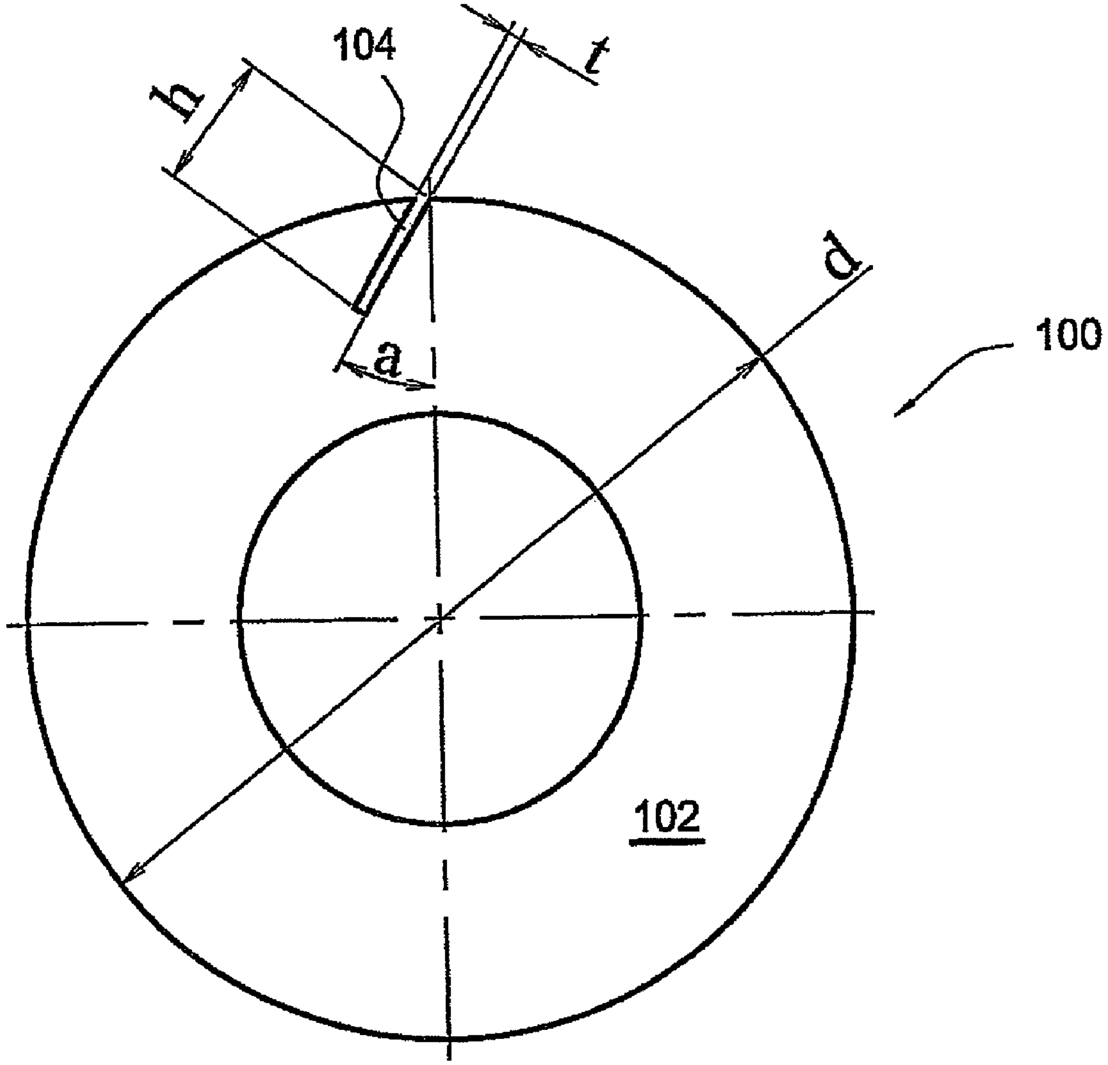
Fig. 6 Prior Art
FIG. 6 shows a cross section of a printing cylinder according to prior art, at right angles to the axis of rotation.

FIG. 6 shows a printing sleeve 100 according to the prior art. The printing sleeve 100 has a solid body 102, which is provided with a groove 104. The solid nature of the printing sleeve in a disadvantageous manner results in a substantial weight of the printing sleeve.

Figure 7:
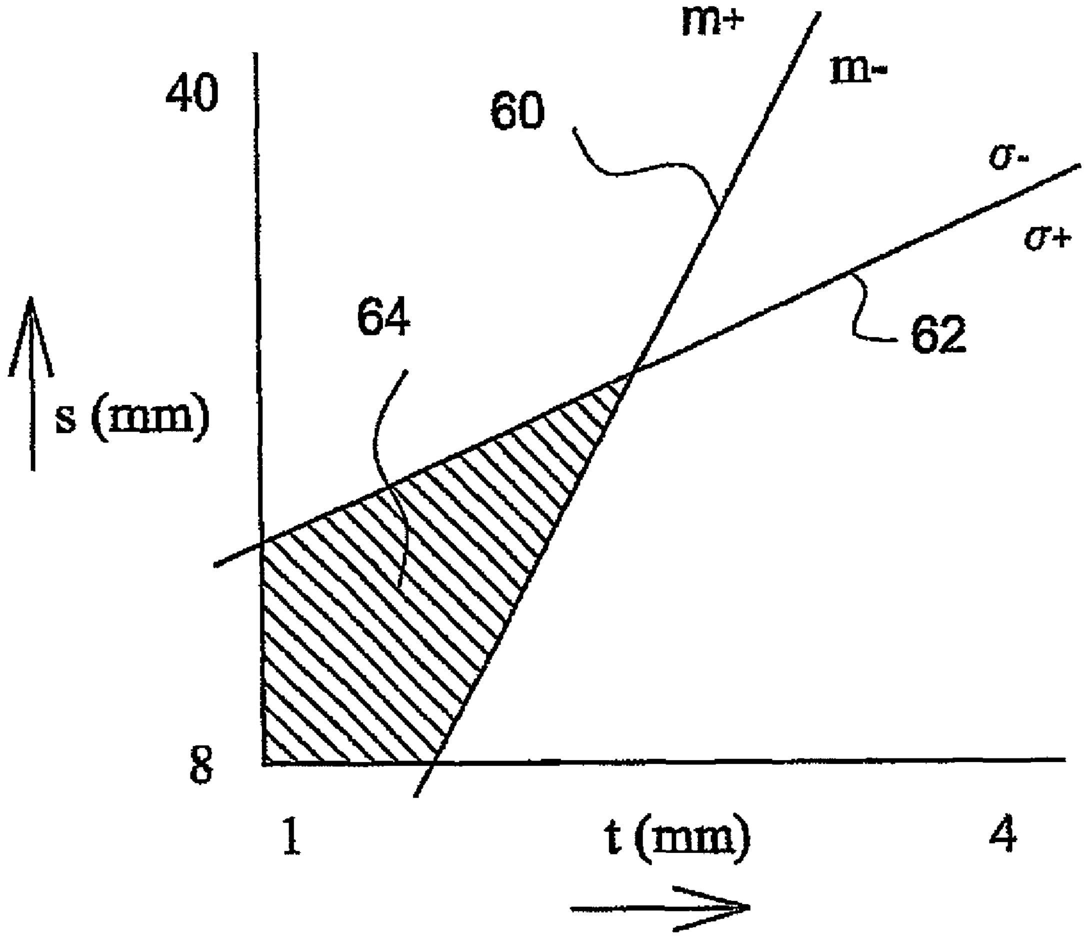
FIG. 7 shows a graph in which the thickness of and the distance between the cups are plotted out.

FIG. 7 shows a graph in which, on the horizontal axis, a dimension t is plotted which represents the (average) wall thickness of the cups 18. On the vertical axis, a distance s is plotted, which represents the distance of the cups 18 with respect to one another in the axial direction of the printing cylinder or printing sleeve.

The graph shows a first line 60 which divides the area into two halves, m+ and m−. m+ represents the area in which the mass of the printing cylinder is sufficiently small and m− represents an area in which the mass of the printing sleeve 10 is deemed to be too large.

The graph also shows a second line 62 which divides the area into two halves, σ+ and σ−. The σ+ indicates the area in which the strength of the printing cylinder is seen as being sufficiently large and σ− indicates an area in which the strength of the printing sleeve 10 is regarded as being insufficient. The hatched area 64 is the area in which the printing sleeve 10 is both sufficiently light and sufficiently strong.

Figure 3A:
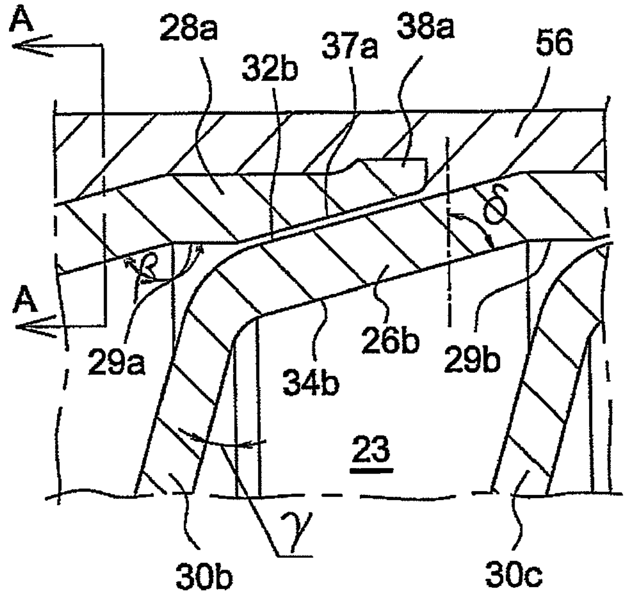
FIGS. 3A and 3B show further details in cross section of the outer edge and inner edge of the printing cylinder according to the invention.
Figure 3B:
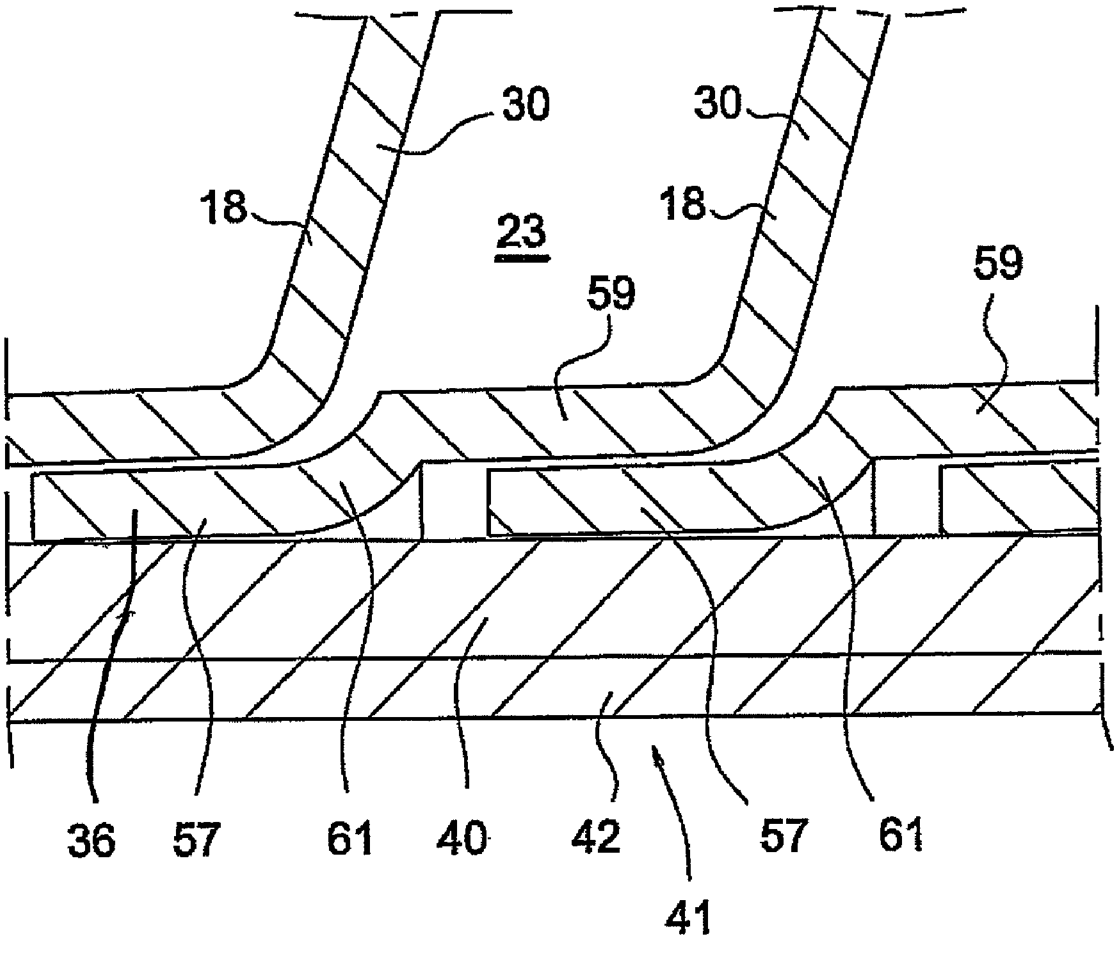
Figure 4A:
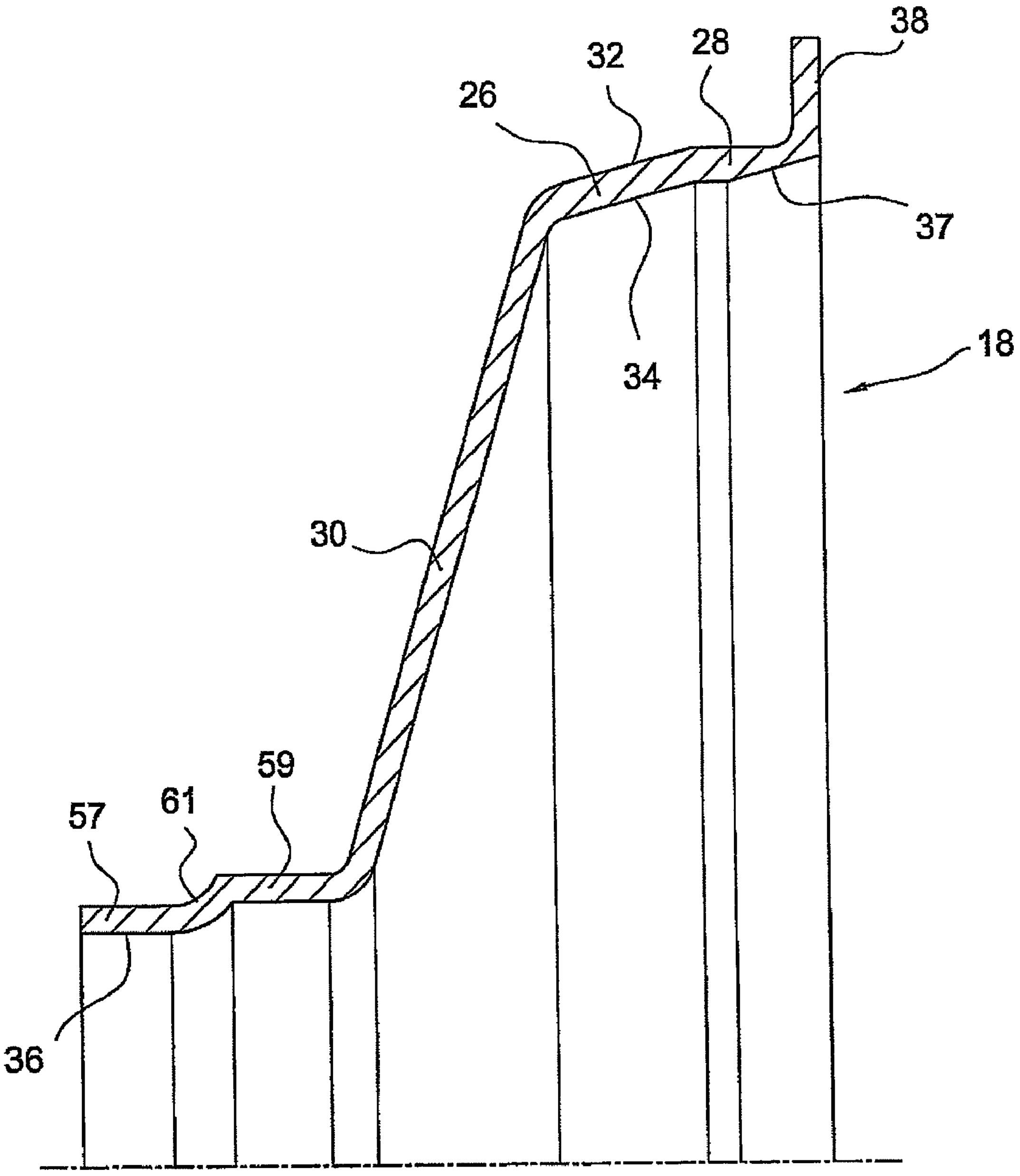
FIGS. 4A and 4B show a cup in cross section with and without an outer edge.
Figure 4B:
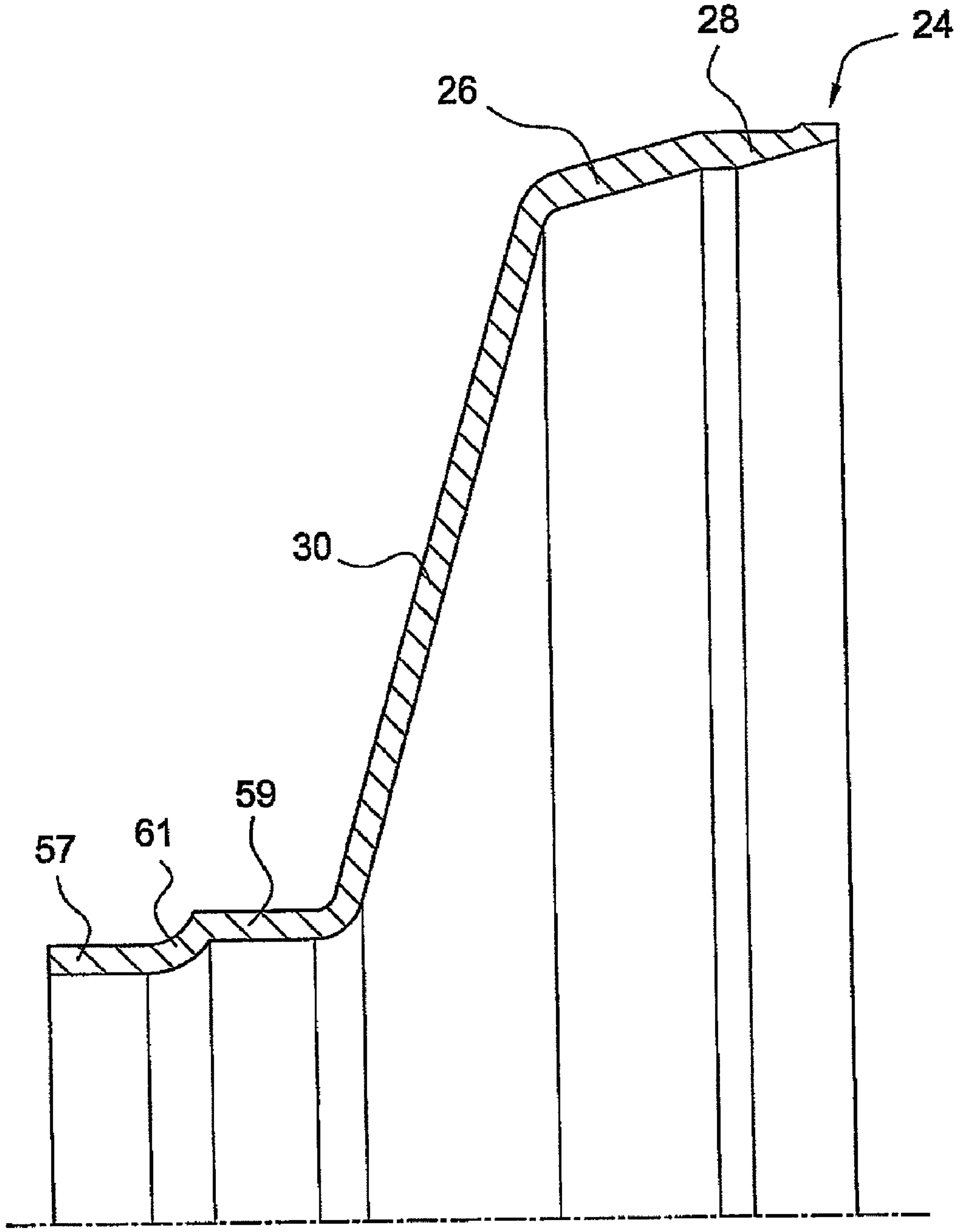
Figure 4C:
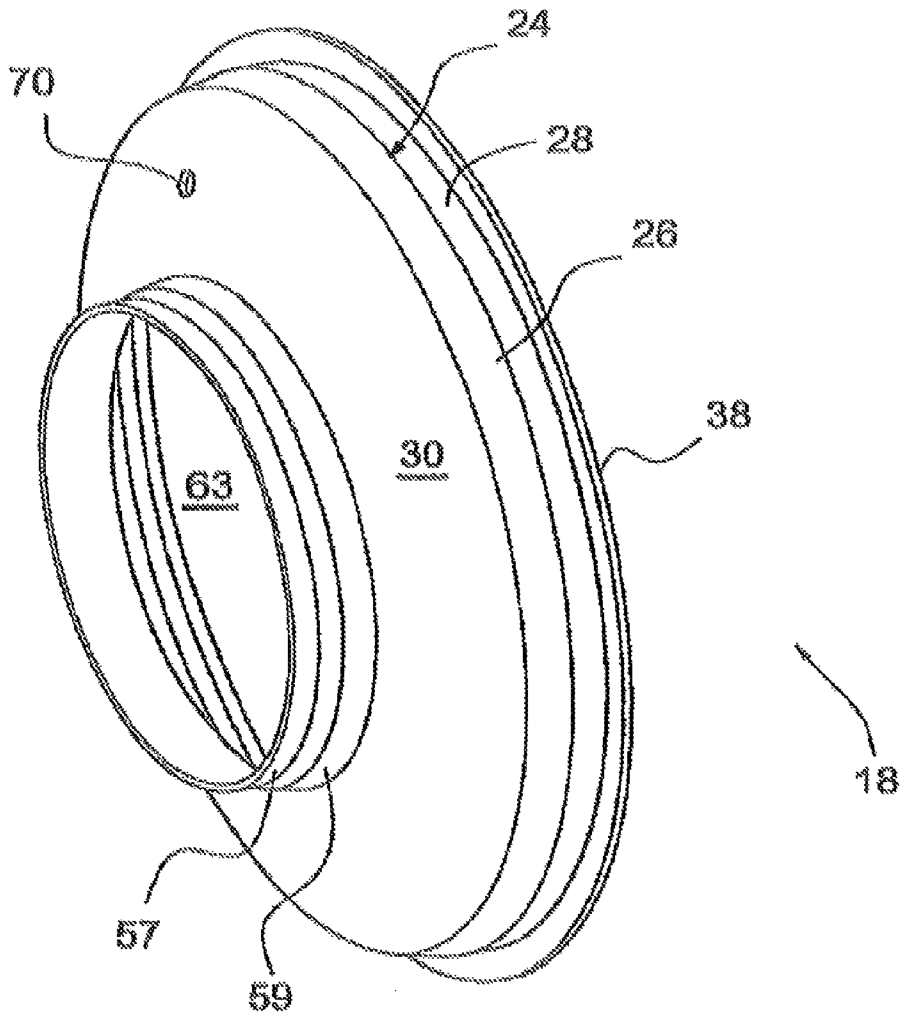
FIG. 4C shows a cup in a perspective view.
Figure 4D:
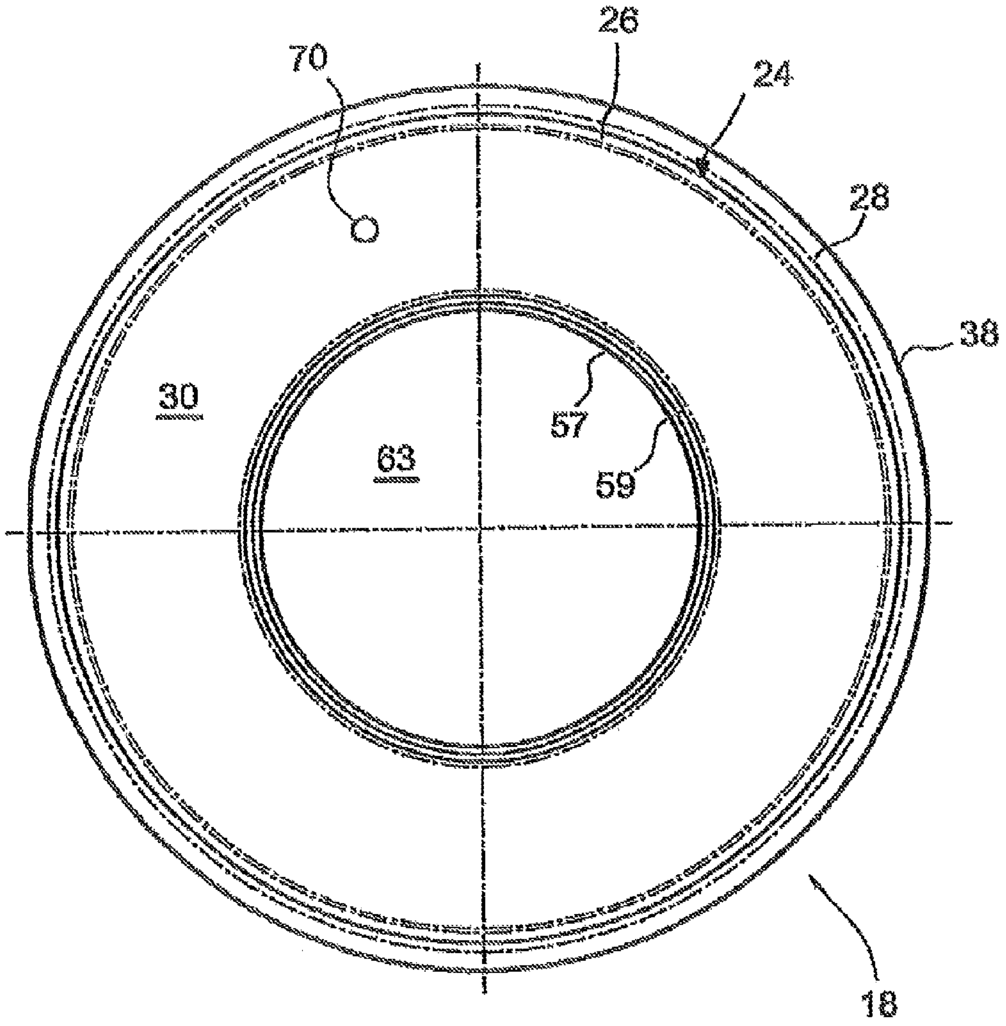
FIG. 4D shows a front view of a cup.
Figure 4E:
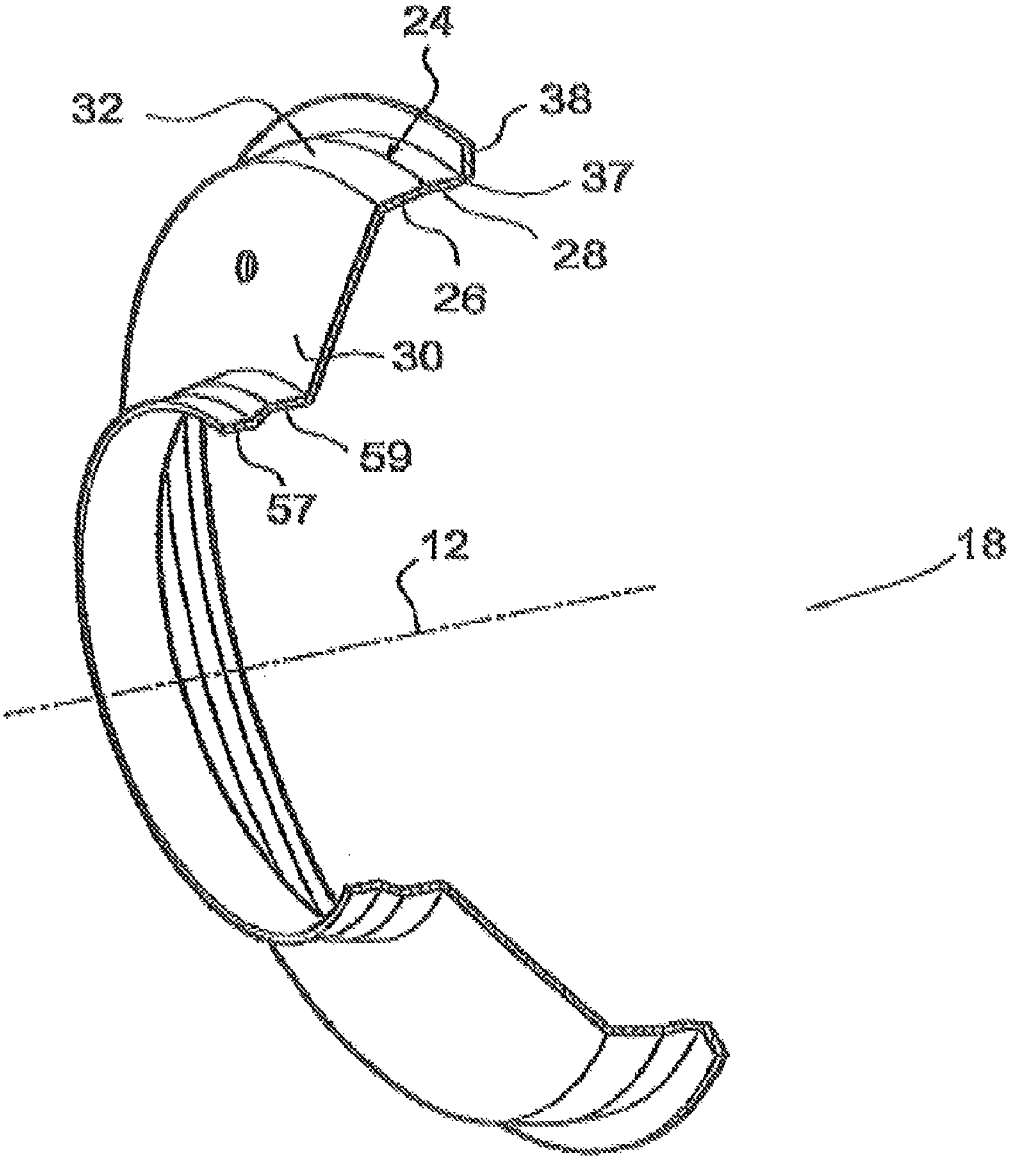
FIG. 4E shows a perspective view of a cup from which a part has been removed.
Figure 8:
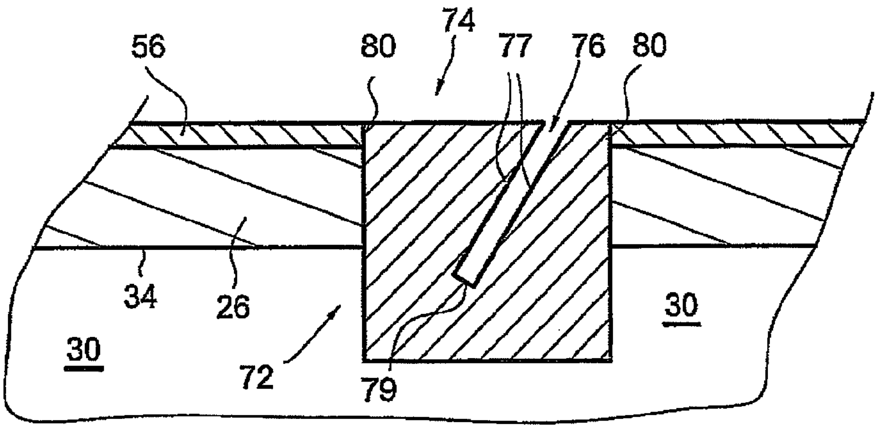
FIG. 8 shows a flat projection of a cross section taken along line A-A in FIG. 3A according to an embodiment.

FIG. 8 shows a flat projection of a cross section of a detail of an insert 72 according to the invention along line A-A in FIGS. 1 and 3A. The insert 72 is situated in a recess 74 in the outer layer 56 and extends through the conical part 26 of the cups 18. The insert 72 defines a groove 76 which is suitable for receiving a strip of a jacket (not shown) to be fitted around the printing cylinder or printing sleeve 10, such as a printing plate with an image or a rubber blanket for transferring the image. The groove has walls 77 and a bottom 79. The insert adjoins the outer layer 56 by means of abutment surfaces 80. The abutment surfaces 80 are situated near the exterior 14 of the printing sleeve 10, more particularly in the outer layer 56 thereof.

In FIG. 8, the insert 72 has a substantially rectangular cross section. The insert is supported by the conical part 26 and the central disc 30 of each cup 18. The conical part 26 and the central disc 30 have a recess for accommodating the insert 72. The insert 72 completely fills the recess. The insert 72 may be a metal extruded profiled section.

Figure 9:
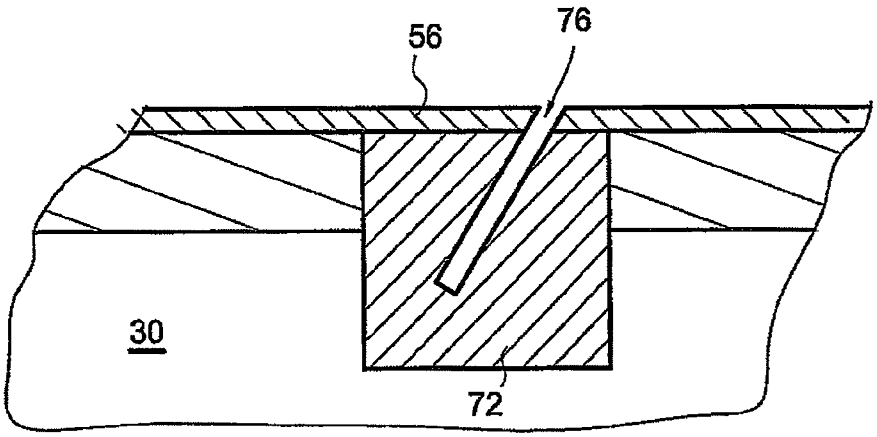
FIG. 9 shows a flat projection of a cross section taken along line A-A in FIG. 3A according to another embodiment.

FIG. 9 shows an embodiment of an insert 72, in which the insert 72 is situated underneath the outer layer 56. The insert in this case supports the outer layer 56 at the location of the recess 74, which also defines the opening of the groove 76.

Figure 10:
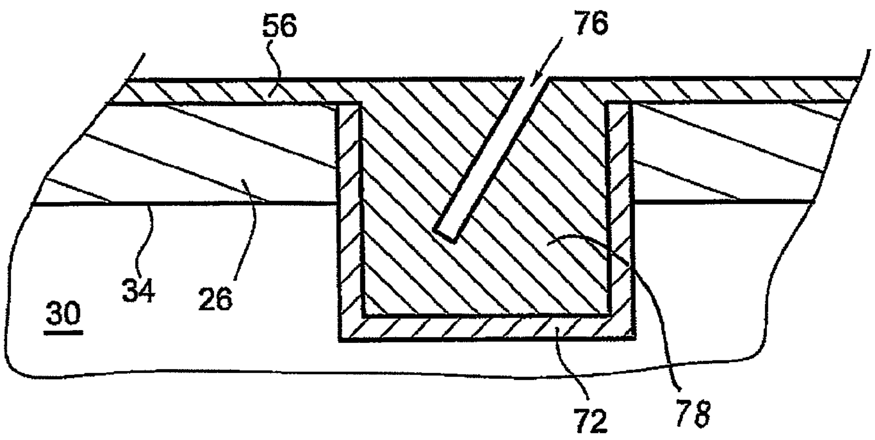
FIG. 10 shows a flat projection of a cross section taken along line A-A in FIG. 3A according to yet another embodiment.

FIG. 10 shows an embodiment of an insert 72, in which the outer layer 56, on the inside, viewed in a radial direction, defines a protuberance 78, with the insert 72 supporting the protuberance.

Figure 11:
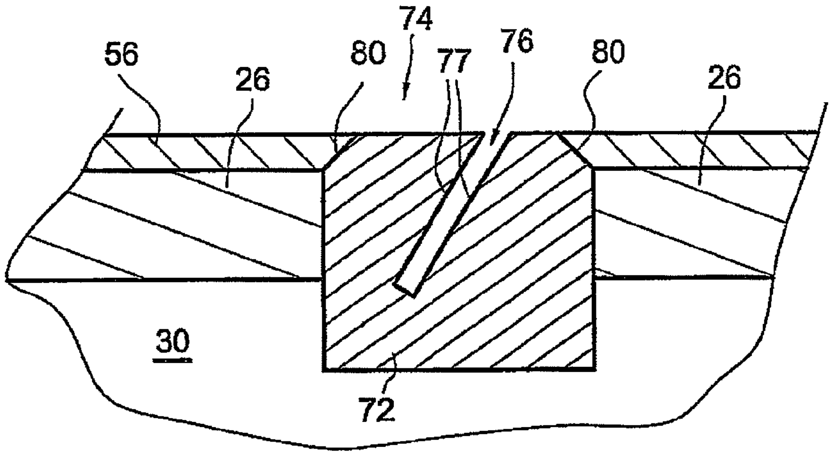
FIG. 11 shows a flat projection of a cross section taken along line A-A in FIG. 3A according to still another embodiment.

FIG. 11 shows an embodiment in which an insert 72 has abutment surfaces 80 which extend at an angle with respect to the radial direction of the cylinder towards one another.

Figure 12:
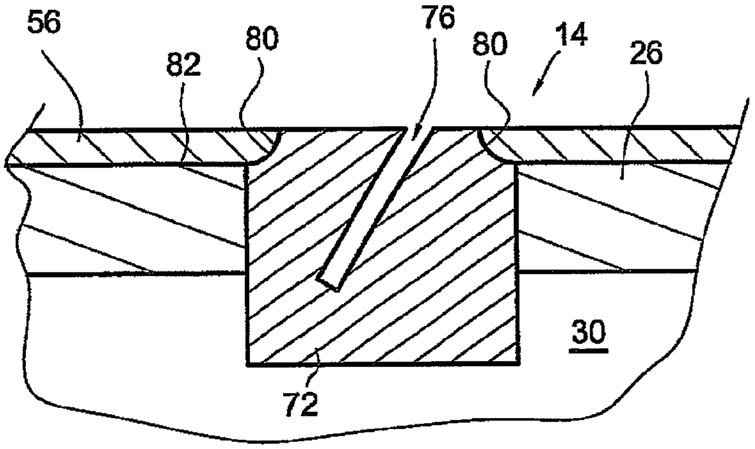
FIG. 12 shows a flat projection of a cross section taken along line A-A in FIG. 3A according to another embodiment.

FIG. 12 shows an embodiment of an insert 72, in which the abutment surfaces 80 are curved. The abutment surfaces 80 extend radially at the location of the exterior 14 of the printing cylinder 10, and the abutment surfaces 80 extend axially at the location of the interior 82 of the outer layer 56.

Figure 13:
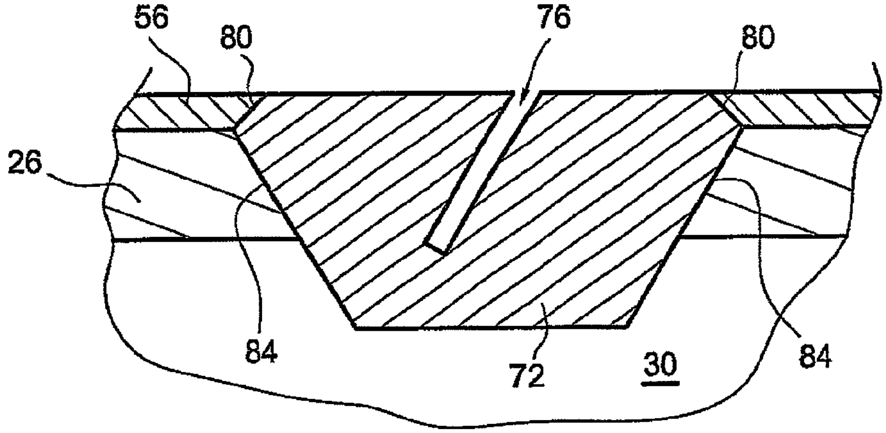
FIG. 13 shows a flat projection of a cross section taken along line A-A in FIG. 3A according to another embodiment.

FIG. 13 shows an embodiment according to the invention, in which an insert 72 has surfaces 84 which extend obliquely outwards with respect to the radial direction of the cylinder. In other words, viewed in a radial direction, the insert 72 has diverging lateral surfaces 84. The diverging surfaces 84 adjoin an aperture in the conical part 26 and the central disc 30 of the cups 18. The cups 18 support the insert 72 at the location of the oblique surfaces 84. One of the advantages of this embodiment is the fact that no adhesive will slide off when the insert 72 is positioned. This is a general advantage of diverging lateral surfaces. In use, the shear forces between diverging lateral surfaces of an insert and the cups will also be smaller than is the case with parallel or converging lateral surfaces.

Figure 14:
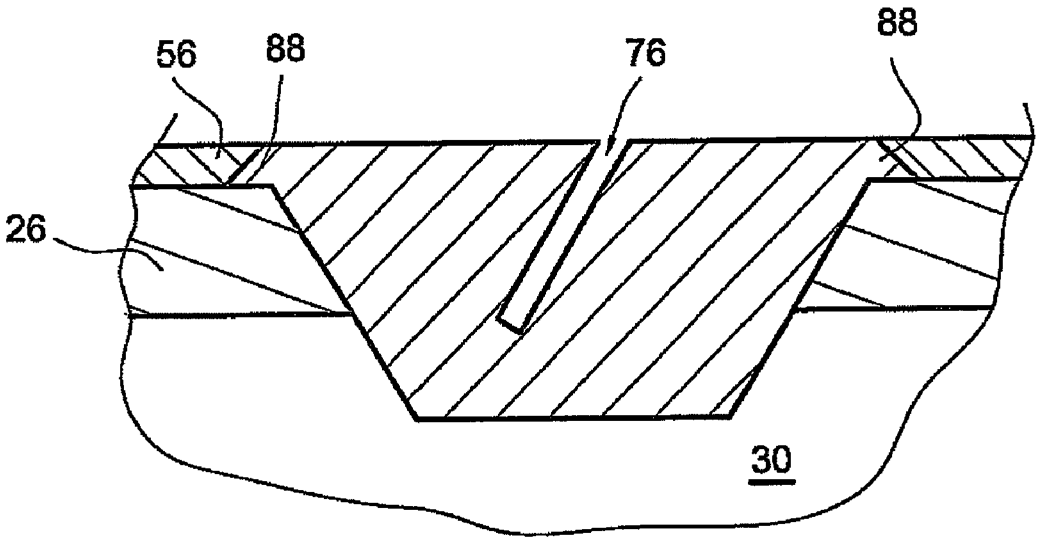
FIG. 14 shows a flat projection of a cross section taken along line A-A in FIG. 3A according to still another embodiment.

FIG. 14 shows an embodiment of an insert 72 with projecting parts 88. The advantage of the projections 88 is that there is a larger surface available for the adhesive for bonding the insert to the conical part 26 and the central disc 30 of the cups 18. Furthermore, this embodiment makes it simple to seal seams and hollow spaces. In addition, the stress in the material during use is relatively low with this embodiment.

In a variant (not shown) of the embodiment from FIG. 14, surfaces 84 and abutment surfaces 80 both extend in a direction which is oblique with respect to a radial of the cylinder and diverge in a radial direction. In particular, the oblique surfaces 84 continue in the same direction in the abutment surfaces 80.

A general advantage of diverging abutment surfaces 80 may be the fact that the risk of the outer layer 56 and abutment surface 80 becoming detached is reduced. After all, both with converging and with diverging abutment surfaces, the end of the material from which the outer layer 56 is made tapers. With a diverging abutment surface 80, said tapering end is situated underneath the insert 72, viewed in a radial direction. When a force is exerted on the exterior 14 of a printing sleeve or printing cylinder, the insert is pushed firmly onto this tapering end, with any shear forces between the outer layer 56 and the insert 72 remaining relatively small.

With a method for producing the embodiments according to FIGS. 9, 10, 11, 12, 13 and 14, first the cylinder is constructed from the cups 18, as described above. After the auxiliary edges 38 have been removed, an opening for accommodating the insert 72 is produced by milling. Subsequently, the outer layer 56 is applied.

With a method for producing the above-described variant (which has not been shown) of the embodiment from FIG. 14, the outer layer 56 is applied following the removal of the auxiliary edges 38. Once the outer layer 56 has been applied, an opening is milled for accommodating the insert 72. The embodiment according to FIG. 8 can be produced using either of the two sequences.

In general, it may be advantageous to apply the outer layer 56 first and to mill a slot afterwards. This facilitates the application and grinding of the outer layer. Generally, this sequence is possible with embodiments of an insert 72 where the side walls run parallel, or diverge with respect to a radial direction.

Figure 15:
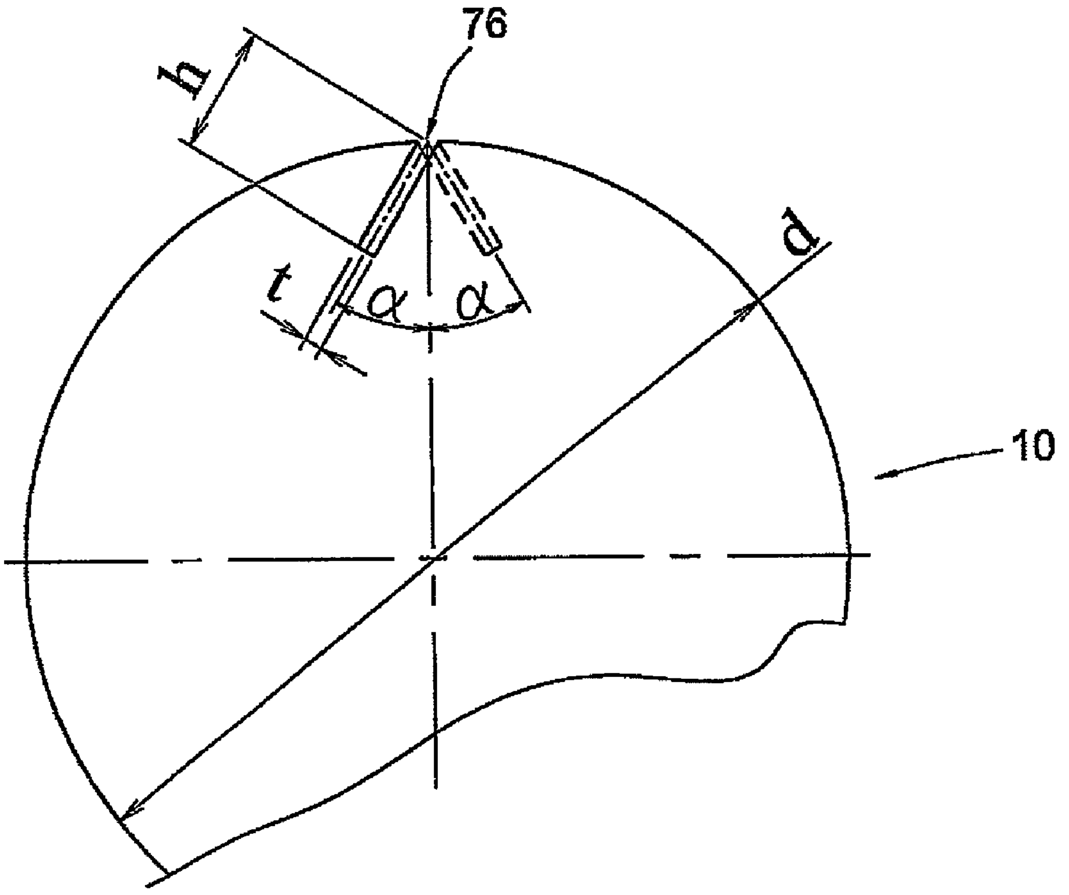
FIG. 15 shows a cross section of a printing cylinder containing a groove.

FIG. 15 shows a printing cylinder 10 with a diameter d, in which a groove 76 having a depth h is made. The diameter d may be in the order of magnitude of 100 to 600 mm, preferably 120 to 450 mm. The groove has a thickness t and runs at an angle $\alpha$ with respect to a radial direction. The angle $\alpha$ is between 0 and 45 degrees, preferably essentially 30 degrees. The depth of the groove 76 is 5 to 35 mm, preferably 7 to 10 mm. The width of the slot is between 0.2 and 5 mm, preferably between 0.3-1.0 mm. The length of the printing cylinder may be 200 to 2000 mm, preferably 500 to 1700 mm.

The scope of the present invention is not limited to the embodiments described above, and several changes and modifications thereof are possible without departing from the scope of protection of the invention as defined in the attached claims. Thus, the cups may be made from a different metal, or even from a non-metal, such as plastic. The insert may likewise be made from plastic, for example fibre-reinforced plastic such as carbon-fibre-reinforced plastic.

The central disc of the cups preferably extends at an acute angle with respect to a radial direction of the cylinder. This acute angle can be directed at the same side as the angle which the outer edge makes with respect to the radial, but the acute angle can also be directed at the other side. In both cases, the central disc is formed by at least one conical surface. In particular, the central disc can be formed by one or more surfaces, which are oriented conically and/or radially. The conical surfaces can in this case all face the same side as the outer edge. It is likewise also possible for one, several or all conical surfaces to face the other side from the outer edge.

Instead of, or in addition to a slot, it is also possible for other coupling means for printing plates and/or rubber blanket (plates) to be provided in the insert, for example clamping means, such as clamping strips. Several types of plastic can be used for the liquid-tight outer layer, but a metal outer layer is also possible.

An insert according to the invention is particularly advantageous in combination with an at least partially open structure, since such an insert reduces the risk of moisture, such as ink or water, penetrating into the cylinder via the coupling means. The expression an at least partially open structure is in this context intended to mean a structure which comprises stiffening means for supporting the liquid-tight cylindrical outer layer. There are several stiffening means distributed over the axial length of the cylinder or sleeve, in particular at least five stiffening means are distributed over the length, more particularly at least ten. The stiffening means support the liquid-tight cylindrical outer layer over substantially its entire axial length. In particular, the stiffening means are evenly distributed over the axial length of the sleeve or cylinder. More particularly, the stiffening means are distributed continually over the length.

The stiffening means comprise a part which extends at least partially in a radial direction. In this context, the expression at least partially in a radial direction is understood to also include a direction which makes an acute angle to a radial direction. Of course, substantially completely radial directions are also possible.

The stiffening means are advantageously formed by partitions, in particular cups, as illustrated in the exemplary embodiments. In addition, internal structures using bars, for example spoke-like structures, are possible. The internal structure can also be formed by plastic foam or metal foam.

The described method step of shaping is advantageous, as cups can be produced using a relatively inexpensive mould, as a result of which only a relatively small investment is required in order to be able to produce several moulds for cups and thus cylinders for various diameters. Nevertheless, other ways of manufacturing are also possible, such as pressing or (injection-) molding. Instead of milling, it is also possible to produce an aperture for the insert by grinding, cutting or sawing. If (injection-) molding is used, the apertures may already be pre-formed in a respective mould It will be understood that the above description of the present invention is susceptible to various modifications, changes and adaptations, and the same are intended to be comprehended within the meaning and range of equivalents of the appended claims.

What is claimed is:

1. A printing cylinder for a printing machine or printing sleeve for forming a printing cylinder, comprising:
- a plurality of cups for forming a supporting inner structure of the printing cylinder or printing sleeve, each cup defining a centre axis and including
  - a central disc, and
  - a radially outer edge coupled to and disposed radially outwardly of the central disc, wherein the radially outer edge includes:
    - an outer conical surface part; and
    - an inner conical surface part, wherein the outer conical surface part of one cup at least partially bears against the inner conical surface part of an adjacent cup in order to form a connection between the one cup and the adjacent cup, and wherein the radially outer edges of the plurality of cups together define a substantially cylindrical outer surface.

2. The printing cylinder or printing sleeve according to claim 1, wherein the radially outer edge of each cup additionally comprises at least one second inner conical surface part.

3. The printing cylinder or printing sleeve according to claim 1, wherein the outer conical surface part of the one cup faces the inner conical surface part of the adjacent cup for forming the connection.

4. The printing cylinder or printing sleeve according to claim 1, wherein the outer conical surface part and the inner conical surface part are situated opposite one another and delimit a conical wall part of the respective cup.

5. The printing cylinder or printing sleeve according to claim 1, wherein at least one of the plurality of cups is provided with an air aperture through the central disc for forming a continuous gas passage through the respective cup.

6. The printing cylinder or printing sleeve according to claim 1, wherein each cup comprises a radially inner edge coupled to and disposed radially inwardly of the central disc, and wherein the radially inner edges of the plurality of cups together define a substantially cylindrical inner surface.

7. The printing cylinder or printing sleeve according to claim 6, wherein the radially inner edge comprises:
- an end, and
- an insertion part disposed between the end and the central disc, wherein an inner diameter of the insertion part is at least equal to an outer diameter of the end, so that the end of one of the plurality of cups is accommodated in the insertion part of an adjacent cup.

8. The printing cylinder or printing sleeve according to claim 1, further comprising an inner cylinder or inner sleeve, around which the cups extend concentrically.

9. The printing cylinder or printing sleeve according to claim 8, wherein the radially inner edges of the plurality of cups are connected to the inner cylinder or inner sleeve.

10. The printing cylinder or printing sleeve according to claim 1, wherein the central disc runs at least partially conically.

11. The printing cylinder or printing sleeve according to claim 1, wherein the central disc runs at least partially conically at a varying angle of inclination with respect to the centre axis of the printing cylinder or printing sleeve.

12. The printing cylinder or printing sleeve according to claim 1, wherein each of the plurality of cups is provided with a cylindrical aperture which runs concentrically around the centre axis for accommodating a cylinder shaft.

13. A cup for forming a supporting inner structure of a printing cylinder or printing sleeve, the cup defining a centre axis and comprising:
- a central disc, and
- a radially outer edge coupled to and disposed radially outwardly of the central disc, wherein the radially outer edge includes:
  - an outer conical surface part; and
  - an inner conical surface part, wherein the outer conical surface part of the cup is configured to at least partially bear against the inner conical surface part of an adjacent cup similarly constructed in order to form a connection between the cup and the adjacent cup, and wherein the radially outer edge of the cup is configured to define in part a substantially cylindrical outer surface of the printing cylinder or printing sleeve.

14. The cup according to claim 13, further comprising at least one cylindrical aperture to reduce weight and form a substantially cup-shaped body.

15. A method for producing a printing cylinder or printing sleeve, comprising:
- providing a plurality of cups, each cup having a central disc and a radially outer edge coupled to and disposed radially outwardly of the central disc, wherein the radially outer edge includes an inner conical surface part and an outer conical surface part; and
- positioning the inner conical surface part of one cup against a complementary outer conical surface part of an adjacent cup.

16. The method according to claim 15, wherein the radially outer edge of each cup includes a radially extending auxiliary edge, the method further comprising:
- providing a gluing clamp on the auxiliary edge of the adjacent cup and on the auxiliary edge of the one cup.

17. The method according to claim 15, wherein prior to the positioning of the one cup, applying at least one first adhesive bead to a first portion of the adjacent cup by rotating the adjacent cup with respect to an adhesive-dispensing opening.

18. The method according to claim 17, further comprising applying a second adhesive bead at the same time to a second portion of the adjacent cup.

* * * * *